Patented June 15, 1937

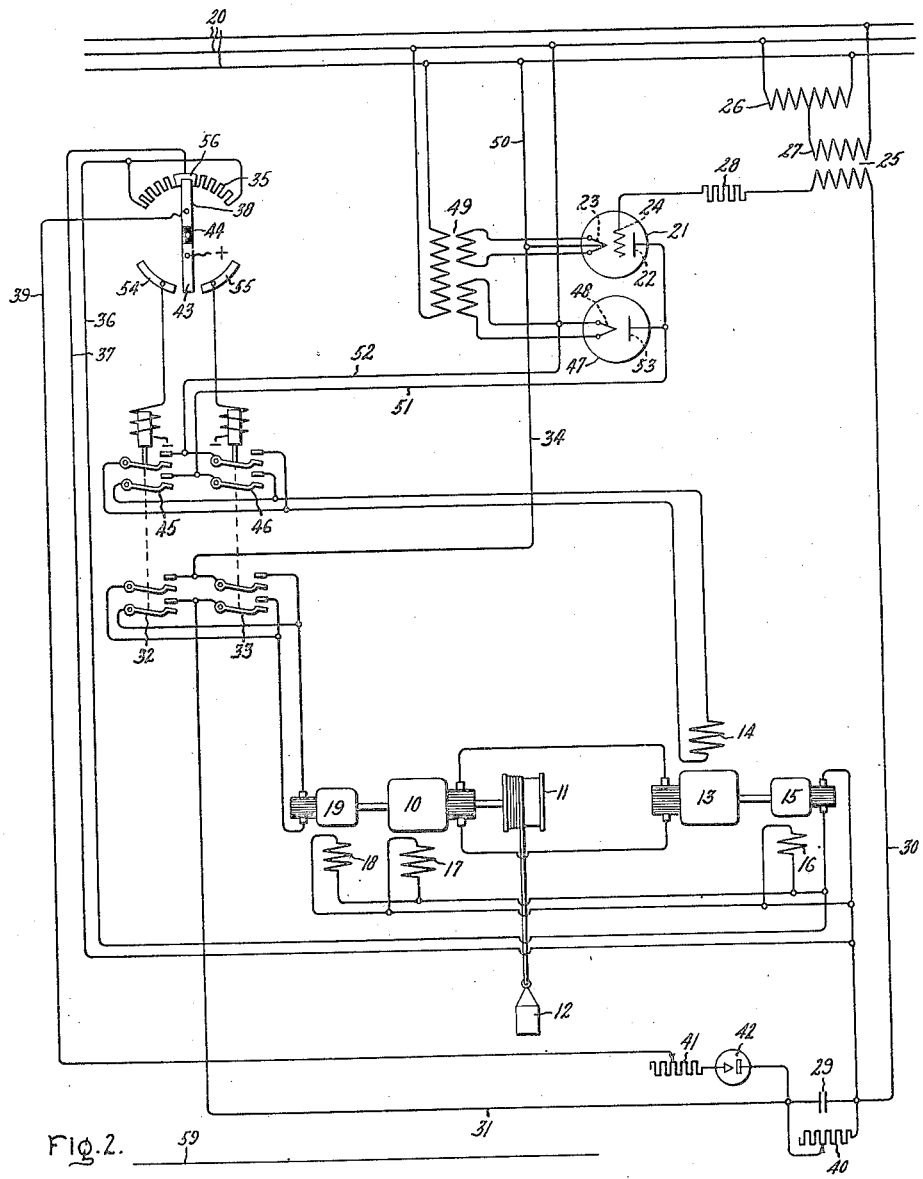
Fig. 1.
Fig. 2.
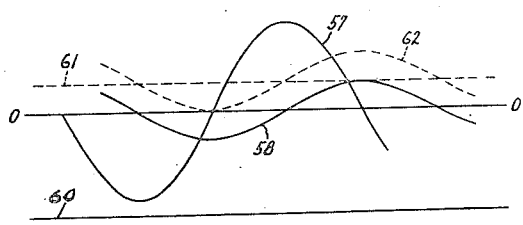
Inventor:
Harold B. LaRoque,
by Harry E. Dunham
His Attorney.

2,084,206

UNITED STATES PATENT OFFICE 2,084,206

SYSTEM OF MOTOR CONTROL

Harold B. La Roque, Scotia, N. Y., assignor to General Electric Company, a corporation of New York Application March 1, 1935, Serial No. 8,860

11 Claims. (Cl. 172—239)

My invention relates to motor control systems, and has for its object the provision of simple and reliable means utilizing electric valves for controlling the speed of a motor.

Although it obviously has other applications, my invention is especially useful in the control of motors driving elevators, hoists and the like in such manner that the driven device is accelerated and decelerated at the predetermined maximum rates permissible under the given conditions of operation and thereby operated at its greatest efficiency.

I also provide means for preselecting a capacitor or bias voltage corresponding with the desired motor speed and means responsive to the speed of the motor for introducing a countercontrol voltage in opposition to the bias voltage, together with input, output and bias voltages of such relative values as to give sensitive control of the motor speed.

In accordance with one form of my invention, I control the motor by means of currents supplied from an electric valve, and control the input circuit of the electric valve by means of a capacitor together with associated means for charging and discharging the capacitor at predetermined rates to thereby change the speed of the motor at corresponding rates.

For a more complete understanding of my invention reference should be had to the accompanying drawing, Fig. 1 of which is a diagrammatic representation of a system of motor control embodying my invention as applied to an elevator; while Fig. 2 is a chart of curves illustrating the relation of the various control voltages.

Referring to the drawing, I have shown my invention in one form as applied to a motor control system of the Ward-Leonard type wherein the motor is supplied with current from a separate generator whose voltage is controlled by field variation to control the speed of the motor. The main driving motor 10 is conventionally shown as being direct connected to a drum 11 on which is wound a cable for raising and lowering the elevator cage 12. This motor 10 is permanently connected to a separate direct current generator 13 having a separately excited field winding 14. It will be understood that the generator is driven by a suitable substantially constant speed electric driving motor not shown. On the shaft of the generator 13 is an exciting generator 15 provided with a shunt field winding 16 and supplying exciting current to the separately excited field winding 17 of the main driving motor 10 and a field winding 18 of a pilot generator 19 direct connected to the main motor 10. This pilot generator 19 is of small current carrying capacity and its function is to generate a voltage which is proportional to the speed of the main driving motor. This voltage is utilized, as will presently be described, in introducing a speed function of the driving motor in the control of the generator field winding 14.

As previously indicated, the motor 10 is controlled by controlling the degree and rate of change of excitation of the generator field winding 14. Current is supplied to the field winding 14 from a suitable three-phase supply source 20 through the intervention of an electric valve 21, shown as a discharge device, acting as a rectifier. The electric discharge device 21 is preferably of the three-element vapor electric type characterized by a large power output controlled by a small amount of grid energy. As is well known in the art, the sealed envelope of this device contains a small quantity of inert gas, such as mercury vapor, whereby the device becomes an arc rectifier. The arc formation between the anode 22 and the cathode 23 and hence the conductivity of the valve is controlled by a grid 24. It will be understood that at certain critical values of grid voltage when the anode is positive the arc will start and will continue thereafter independently of the grid voltage as long as the anode is positive. Furthermore, as long as the grid voltage is more negative with respect to the anode voltage than the critical value at which the arc starts, the arc is prevented from starting and no current flows. The generator field winding 14 is connected as shown in the anode or output circuit of the discharge device 21.

I preferably control the electric discharge device by energizing its input or grid circuit from the alternating current supply source 20 and combining with this alternating voltage a direct current grid biasing voltage of controllable value whereby in effect the phase angle of the input voltage is shifted with respect to the output voltage. In this manner the time in each positive half wave of the output voltage that the electric device begins to operate is controlled to vary the current supplied by the electric discharge device to the field winding 14. In other words the duration of conductivity, i. e., length of time or portion of the positive half cycle that the discharge device conducts current, is controlled to thereby control the current supplied to the field winding 14.

As shown, an alternating voltage is supplied from the source 20 to the input circuit by means of a transformer 25 having two primary windings 26 and 27 connected in a Scott connection, as indicated on the drawing, to give a voltage having a 90° lagging phase relation with the voltage supplied to the output circuit from the two lower mains of the supply source 20. One terminal of the secondary of the transformer is connected through a suitable current limiting resistance 28 of high ohmic value to the grid 24. The opposite terminal of the secondary winding is connected to the grid biasing means comprising a capacitor or condenser 29 and the armature of the small pilot generator 19, these connections being made through a conductor 30 to the condenser and from the condenser through a conductor 31 to reversing switches 32 and 33, thence through the armature of the pilot generator and conductor 34 to the cathode 23.

The purpose of the condenser is to introduce a direct voltage of controllable magnitude in the input circuit to thereby bias the grid of the discharge device. To that end, the condenser is connected through a potentiometer resistance 35 to the exciter 15 so as to be charged. It will be observed that the resistance 35 is connected in two parallel portions of equal resistance by means of conductors 36 and 37 directly across the armature terminals of the exciter, the conductor 36 leading to the two extremities of the resistance while the conductor 37 leads to a central tap. By means of a pivotally mounted contact arm 38 cooperating with the resistance, a variable voltage is obtained from the resistance and applied through a conductor 39 to one side of the condenser 29, the opposite side of the condenser being connected as shown to the conductor 37. In the central position of the contact arm 38 shown in the drawing, of course, no voltage is derived from the resistance and the condenser is therefore not charged, any previous charge having been dissipated through a variable discharge resistor 40 connected across the condenser. When the contact member, however, is moved in either direction from the central position shown, a voltage of gradually increasing value is applied to the condenser and the condenser thereby charged to a degree depending upon the voltage. The condenser thus introduces its terminal voltage in the input circuit, its voltage being always opposed by the voltage of the pilot generator by reason of the closure of the appropriate reversing switch 32 or 33. Furthermore, the condenser is connected so that its voltage is in the same direction as the positive half of the input voltage supplied from the source 20.

The value of the voltage across the condenser determines the ultimate speed of the driving motor, while its rates of charge and discharge determine the rates of acceleration and deceleration of the motor. The rate of charge of the condenser is maintained at a suitable predetermined value by means of an adjustable resistance 41 of large ohmic value connected in the conductor 39 in series with a suitable rectifier 42, such as a copper oxide rectifier, which is arranged to pass current to the condenser to charge it. Likewise, the resistance 40 is of suitable large ohmic value and adjusted to permit the condenser to discharge at a predetermined desired rate when the contact arm 38 is moved back toward its central position shown in the drawing, discharge through the potentiometer resistance 35 being prevented by the rectifier 42.

The contact arm 38 is preferably actuated in unison with the starting and stopping switch of the elevator. It is shown diagrammatically as secured to the starting and stopping control switch arm 43 of the elevator, the two arms being electrically insulated from each other, and as shown mounted on a pivoted support 44 formed of electrically insulating material. The arm 43 controls the selected opening and closing of electromagnetically actuated reversing switches 45 and 46 in the circuit of the generator field winding 14. Preferably as shown, the reversing switches 32 and 33 are respectively secured to and actuated with the reversing switches 45 and 46.

For the purpose of maintaining the excitation of the field winding 14 during the negative half cycle when the discharge device 21 is inactive, a rectifier device 47 preferably of an electric discharge type is connected across the field winding. The cathode 48 of the device 47 is heated by means of currents supplied to it from a suitable transformer 49, which has a separate secondary winding supplying heating current to the cathode 23 of the device 21. The circuit of the field winding 14 may be traced from the lower supply main of the supply source 20 through the conductor 50, electric discharge device 21, conductor 51, through one or the other of the reversing switches, the field winding, and back through conductor 52 to the upper supply main of the supply source. Since the anode 53 of the device 47 is connected to the conductor 51, the device 47 cannot pass current when the device 21 is effective, its anode then being obviously more positive than its cathode. At the instant, however, that the device 21 becomes inactive, thereby opening the circuit of the field winding, the resulting decrease in flux in the field winding induces a voltage in the field winding of opposite polarity and therefore the cathode of the device 47, which is connected to the conductor 52, becomes positive and allows current to pass through it, thus substantially maintaining the excitation of the field winding throughout the negative half of the voltage wave.

In the operation of the system, assuming that the generator 13 is being driven at its full substantially constant operating speed, the elevator is started by moving the control arm 43 from the central position shown to either the right or the left, depending upon the desired direction of operation of the elevator, into engagement with one or the other of the contact segments 54 and 55. This energizes the operating coil of one or the other of the reversing switches 45 and 46, closing it, and thereby closing the circuit of the field winding 14 for the excitation direction to give the desired direction of rotation of the driving motor 10.

A short conducting segment 56 is provided in the center of the control resistance 35 for the purpose of permitting a small angular movement of the control arm 38 in each direction to effect its engagement with either the conducting segment 54 or segment 55 before the contact arm leaves the segment 56 and engages one half or the other of the resistance 35. This provides for movement of the control arm to close the selected reversing switch 45 or 46 before voltage is applied to the condenser 29. In other words, the field winding 14 is connected to the discharge device 21, while the input voltage from the transformer 25 is in its 90 degree lagging relation with the output voltage. Under these conditions the discharge device becomes effective at substantially the peak of its positive output voltage wave, and continues to operate for the latter half of the wave. No appreciable current, however, is produced in the field winding 14 under this condition because the voltage produced by the discharge device is rapidly decreasing incident to the decreasing instantaneous value of its output supply voltage, and the high reactance of the field winding effectively prevents the flow of any appreciable current in the field winding. Therefore, no appreciable voltage is produced by the generator 13, and the driving motor 10 does not start. The control arm 38 may then be moved from the conducting segment 56 into engagement with the resistance 35 and over the resistance to a point corresponding with the desired final speed. Or, if desired, the control arm 38 may be moved far enough only to give a very low speed of the driving motor, for example in bringing the elevator accurately to rest at a floor.

To accelerate the elevator, the arm 43 is moved over the segment 54 or 55 further from its central position whereby a voltage from the potentiometer resistance 35 is applied to the condenser 29. This condenser voltage, the voltage of the pilot generator 19 then being negligible, introduces a positive bias in the input circuit of the discharge device 21, thus causing the discharge device to supply more current to the field winding 14. As the motor 10 accelerates, the voltage of the pilot generator 19 is introduced into the input circuit in opposition to the voltage across the condenser 29 and will eventually match the condenser voltage to an extent sufficient to give a predetermined driving motor speed corresponding with the position of the potentiometer arm 38. The rate of acceleration of the motor is determined in the matching process by the rate of charge of the condenser.

When the elevator is slowed down by a movement of the arms 38 and 43 back toward their central position shown the condenser discharges through the resistance 40, thus decreasing the current supplied to the field winding 14, and the pilot generator 19 in matching this decreasing condenser voltage causes the driving motor to decelerate at a corresponding rate.

Obviously, if desired, a second electric discharge device similar to the device 21 may be used and controlled to rectify the other half of the voltage wave. In such case, the device 47 is of course not used.

The input voltage applied to the discharge device 21 by the transformer 25 may be and preferably is 10 or 15 per cent of the bias voltage across the condenser 29 when the condenser is fully charged. Preferably also the condenser voltage fully charged is higher than the maximum instantaneous voltage of the supply source 20, which voltage is applied to the output or plate circuit of the discharge device 21.

It will be understood that with the input voltage from the transformer 25 lagging 90 degrees with respect to the output voltage from the source 20, the voltage from the condenser 29, or more specifically the differential voltage of the condenser over the opposing regulating voltage from the generator 19, in order to control the discharge 21 throughout its complete control range must be equal to the maximum instantaneous value of the input voltage supplied by the transformer 25. This will be understood from the fact that the negative half of the input voltage wave series to control the discharge device but the condenser voltage is opposite to this negative half, and if its preponderance over the voltage of the generator 19 equals the maximum of this half wave it completely offsets this half wave and in effect shifts the input voltage to decrease its angle of lag with the output voltage. This is shown diagrammatically in Fig. 2 in which curve 57 represents the output voltage from the source 20 while curve 58 represents the input voltage from the transformer 25. The condenser voltage is indicated by the line 59 with respect to the base line 0—0, while the voltage of the generator 19 is indicated by the line 60. The difference between the condenser and generator voltages is indicated by the dotted line 61, the two voltages being selected for purposes of illustration with values such that this difference is just equal to the maximum instantaneous value of the input voltage 58. It will be seen that the differential voltage 61 has the effect of raising the input voltage with respect to the axis line 0—0 so that the result is a voltage indicated by the dotted wave 62. Since this voltage 62 turns positive at the same instant as the output voltage 57, it starts the discharge device 21 at the beginning of the positive half cycle of the output voltage and consequently the discharge device operates at full capacity.

It will now be clear that a change in the differential voltage 61 between 0 and the value indicated, serves to control the discharge device throughout its desired controllable range. With a differential of a value indicated by line 61, the discharge device, as previously stated, starts to operate at the beginning of its positive half cycle and therefore is fully effective. Any differential voltage greater than 61, while it has the effect of still further shifting the input voltage has no effect on the discharge device since it is already operating at full capacity. This condition of operation of the discharge device gives of course the maximum current input to the field winding 14 and consequently maximum current to the driving motor 10, whereby the driving motor accelerates at its maximum rate for the particular load.

Preferably the system will be adjusted, for example, by adjusting the resistances 40 and 41 and by arranging the field winding 14 with a sufficiently low time characteristic and the driving motor 10 with a sufficiently high rate of acceleration, so that the differential condenser voltage 61 will never appreciably exceed the relative value indicated in Fig. 2. As a practical matter, the maximum permissible rate of acceleration and deceleration of the elevator 12 will be determined and the generator 13 and the motor 10 designed with characteristics to give these maximum rates. It will then be simply a matter of adjusting the resistances 40 and 41 to give a rate of change of condenser charge such that the differential condenser voltage cannot exceed the value 61. With this relation established, the discharge device 21 is always operating within its controllable range, and consequently the driving motor speed is always subject to regulation. It will be understood that a condition of balance is established between the voltages of the condenser and the generator 19 such that the difference between these voltages will remain at some mean value which is substantially constant, although fluctuating somewhat above and below this mean value, and sufficient to give the required speed of the driving motor 10. This balance will be established both during acceleration and deceleration as well as during full speed operation, or operation at the particular speed determined by the position of the control switch arm 38.

With the input or grid voltage only a fraction as specified of the voltage across the condenser, a relatively small variation only in the condenser voltage and the voltage of the generator 19 serves to control the discharge device 21 throughout its full controllable range. This of course gives the desirable result that the driving motor speed changes necessary to control the discharge device and maintain a predetermined mean speed are small as compared with the total speed of the motor.

While I have shown a particular embodiment of my invention, it will be understood of course that I do not wish to be limited thereto since many modifications may be made, and I therefore contemplate by the appended claims to cover any such modifications as fall within the true spirit and scope of my invention.

What I claim as new and desire to secure by Letters Patent of the United States is:

1. A system of motor control comprising in combination with a motor, an electric discharge device, means for producing a control voltage, manually operated means movable to preselect a final value of said voltage, means for varying said voltage to said final value at a predetermined rate after such preselection, means responsive to the speed of said motor for producing a second voltage in opposition to said control voltage, means for controlling the conductivity of said discharge device in response to the difference between said voltages, and control means for said motor responsive to the conductivity of said discharge device.

2. In a system of motor control an electric discharge device having input and output circuits, means for supplying alternating voltages having a predetermined phase relation to each other respectively to said input and output circuits, motor speed control means connected to said output circuit, means for introducing a biasing voltage in said input circuit to vary the phase relation of said alternating voltages and thereby vary the conductivity of said discharge device, means movable to select a desired value of said biasing voltage, means for thereafter changing said biasing voltage at a predetermined rate to said selected value to thereby actuate said motor control means at a correspondingly predetermined rate, means driven by said motor for producing a voltage varying with the speed of said motor, and means for applying said voltage to said output circuit in opposition to said biasing voltage.

3. A system of motor control comprising in combination with a motor, speed control means for said motor, an electric discharge device provided with input and output circuits, connections between said output circuit and said speed control means, a variable voltage energy storage element, connections between said energy storage element and said input circuit, means for varying the energy stored in said element at a predetermined rate to thereby vary the voltage of said element at a predetermined rate, means for controlling the amount of energy stored in said element whereby said discharge device is controlled to control the rate of change of speed and the final speed of said motor, and a source of voltage responsive to the speed of said motor connected in opposition to the voltage of said energy storage element to thereby vary the voltage applied to said input circuit.

4. A system of motor control comprising in combination with a motor, speed control means for said motor, an electric discharge device provided with input and output circuits, a source of variable voltage for said input circuit, manually operated means for varying the value of said voltage to a desired value, means for causing said voltage to change at a predetermined rate, means responsive to the speed of said motor for producing a voltage in opposition to said first voltage to control the input circuit of said discharge device in accordance with the speed of the motor, and connections between said speed control means and said output circuit, said voltage varying means causing said voltage to decrease at a predetermined rate when said manually operated means is moved to decrease said voltage.

5. A system of motor control comprising in combination with a motor, control means for said motor, an electric discharge device provided with input and output circuits, connections between said control means and said output circuit, a condenser connected to said input circuit for applying a biasing voltage to said input circuit, means for causing the voltage of said condenser to change at a predetermined rate to control the rate of change of speed of said motor, means responsive to the speed of said motor for applying a second voltage to said input circuit in opposition to the voltage of said condenser, and manually operated means for applying a variable charging voltage to said condenser.

6. A system of motor control, comprising in combination with a driving motor, a separate generator for said motor provided with a separately excited field winding, an exciting generator, a pilot generator driven by said motor, an electric discharge device provided with input and output circuits, connections between said generator field winding and said output circuit including a source of alternating voltage, means for applying an alternating voltage to said input circuit having a predetermined out of phase relation to said first mentioned alternating voltage, a condenser, means connecting said condenser and said pilot generator in series to said input circuit, connections for charging said condenser from said exciting generator at a predetermined rate to control the rate of acceleration of said motor, and means for discharging said condenser at a predetermined rate to control the rate of deceleration of said motor.

7. A system of motor control comprising in combination with a driving motor, a separate generator for said motor provided with a separately excited field winding, an exciting generator, a pilot generator driven by said motor, an electric discharge device provided with input and output circuits, connections between said generator field winding and said output circuit including a source of alternating voltage, means for applying an alternating voltage to said input circuit of smaller value than said output voltage and having a predetermined out of phase relation to said first mentioned alternating voltage, and means connecting said exciting generator and said pilot generator in series with each other in said input circuit, said exciting generator normally having a voltage at least several times said output voltage.

8. In a system of motor control, a vapor electric discharge device having input and output circuits, means for supplying an alternating voltage to said output circuit, means for supplying an alternating voltage to said input circuit having the same frequency as said output voltage but smaller in value than said output voltage and displaced in phase substantially 90 degrees with respect to said output voltage, motor speed control means connected to said output circuit for controlling the speed of said motor in accordance with the duration of conductivity of said discharge device, means for producing a D. C. biasing voltage having a value corresponding with a predetermined desired speed of said motor and at least seven times as great as said input voltage, means for introducing said biasing voltage in said input circuit to control the duration of conductivity of said discharge device, means driven by said motor for producing a D. C. counter voltage varying with the speed of said motor, means for applying said counter-voltage to said input circuit in opposition to said biasing voltage, and means for varying said biasing voltage at a predetermined rate not substantially greater than the rate of change of said counter-voltage.

9. In a motor control system, an electric discharge device having input and output circuits, means for supplying alternating voltages having a predetermined phase relation to each other respectively to said input and output circuits, motor speed control means connected to said output circuit, means for introducing a biasing voltage in said input circuit to vary the phase relation of said alternating voltages and thereby operate said motor control means, means responsive to an operating condition of the motor for producing a second voltage in opposition to said biasing voltage, connections for introducing said second voltage in said input circuit in opposition to said biasing voltage whereby said motor control means is responsive to the difference between said voltages, means movable to select a desired value of said biasing voltage, and means for thereafter changing said biasing voltage at a predetermined rate to said desired value to thereby operate said speed control means at a predetermined rate.

10. In a motor control system, an electric discharge device having input and output circuits, means for supplying alternating voltages to said circuits having a predetermined out of phase relation to each other, motor control means connected to said output circuit, a condenser connected in said input circuit, voltage producing means responsive to an operating condition of the motor connected in said input circuit in series with said condenser, connections for charging said condenser with a voltage in opposition to the voltage of said producing means whereby said input voltage is shifted in response to the difference between said voltages to control said discharge device and thereby operate said motor control means.

11. In a motor control system an electric discharge device having input and output circuits, means for supplying alternating voltages to said circuits having a predetermined out of phase relation to each other, motor control means connected to said output circuit, a condenser connected in said input circuit, voltage producing means responsive to the speed of the motor connected in said input circuit in series with said condenser, connections for charging said condenser with a voltage in opposition to the voltage of said producing means whereby said input circuit voltage is shifted by the difference between said voltages to control said discharge device, and means for controlling the charging rate of said condenser to thereby operate said speed control means at a corresponding rate.

HAROLD B. LA ROQUE.